(12) United States Patent
Azuma

(10) Patent No.: US 9,122,061 B2
(45) Date of Patent: Sep. 1, 2015

(54) CONFOCAL OPTICAL SCANNER AND CONFOCAL MICROSCOPE

(71) Applicant: YOKOGAWA ELECTRIC CORPORATION, Tokyo (JP)

(72) Inventor: Takuya Azuma, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 335 days.

(21) Appl. No.: 13/693,322

(22) Filed: Dec. 4, 2012

(65) Prior Publication Data
US 2013/0148184 A1  Jun. 13, 2013

(30) Foreign Application Priority Data

Dec. 7, 2011  (JP) .................................. 2011-267926

(51) Int. Cl.
| | |
|---|---|
| G02B 21/06 | (2006.01) |
| G02B 26/10 | (2006.01) |
| G02B 21/08 | (2006.01) |
| G02B 21/00 | (2006.01) |

(52) U.S. Cl.
CPC .......... *G02B 26/105* (2013.01); *G02B 21/0044* (2013.01); *G02B 21/0076* (2013.01); *G02B 21/08* (2013.01)

(58) Field of Classification Search
CPC ........... G02B 21/0032; G02B 21/0076; G02B 21/0044; G02B 21/08; G02B 26/0816; G02B 26/105
USPC .......... 359/232, 234, 236, 368, 384–385, 388
See application file for complete search history.

(56) References Cited

U.S. PATENT DOCUMENTS

| | | |
|---|---|---|
| 5,717,519 A | 2/1998 | Sugiyama et al. |
| 5,847,867 A | 12/1998 | Sugiyama et al. |

(Continued)

FOREIGN PATENT DOCUMENTS

| | | |
|---|---|---|
| EP | 1391177 A1 | 2/2004 |
| EP | 2312369 A1 | 4/2011 |

(Continued)

OTHER PUBLICATIONS

Linos AG: "Catalog 2003", 2003, Linos, Gottingen, XP002693112, p. U8.

(Continued)

*Primary Examiner* — James Phan
(74) *Attorney, Agent, or Firm* — Lowe Hauptman & Ham, LLP

(57) ABSTRACT

A confocal optical scanner includes: a plurality of condenser elements each configured to concentrate illumination light to be applied on a sample to produce fluorescence from the sample; a plurality of optical scanning units including a plurality of openings each configured to allow the illumination light concentrated by the condenser element to pass the opening, the optical scanning units each configured to scan the sample with the illumination light that has passed through the opening; a moving mechanism configured to move the optical scanning units to select one of the optical scanning units; and an incident-angle adjusting part configured to adjust the incident angle of the illumination light incident on the optical scanning unit selected from the optical scanning units according to the selected optical scanning unit.

21 Claims, 11 Drawing Sheets

(56) References Cited

U.S. PATENT DOCUMENTS

| | | |
|---|---|---|
| 2004/0085627 A1 | 5/2004 | Okamura et al. |
| 2006/0044556 A1 | 3/2006 | Kawano |
| 2011/0090553 A1 | 4/2011 | Kei |
| 2011/0216404 A1 | 9/2011 | Nezu et al. |

FOREIGN PATENT DOCUMENTS

| | | |
|---|---|---|
| EP | 2367042 A1 | 9/2011 |
| JP | 926545 A | 1/1997 |
| JP | 10232352 A | 9/1998 |
| JP | 2006082120 A | 3/2006 |
| JP | 2006126363 A | 5/2006 |
| JP | 200958776 A | 3/2009 |
| JP | 2011-085759 A | 4/2011 |
| JP | 2011180411 A | 9/2011 |
| WO | 9529419 A1 | 11/1995 |
| WO | 2006085480 A1 | 8/2006 |

OTHER PUBLICATIONS

Partial European Search Report corresponding to EP12195440.8, dated Mar. 18, 2013.

US 9,122,061 B2

CONFOCAL OPTICAL SCANNER AND CONFOCAL MICROSCOPE

CROSS-REFERENCE TO RELATED APPLICATION

This application claims priority from Japanese Patent Application No. 2011-267926 filed with the Japan Patent Office on Dec. 7, 2011, the entire content of which is hereby incorporated by reference.

BACKGROUND

1. Technical Field

Embodiments described in this specification relates to a confocal optical scanner that scans a sample with illumination light to obtain a confocal image and to a confocal microscope equipped with such a confocal optical scanner.

2. Related Art

Heretofore, a confocal microscope has been used in various kinds of observations. The confocal microscope is provided with a confocal optical scanner for scanning a sample with illumination light. In particular, the confocal optical scanner employs laser light irradiation to scan a sample in which a fluorescent material (e.g., fluorescent pigment or fluorescent protein) is incorporated. The laser light (irradiation light) excites the fluorescent material in the sample to generate fluorescence from the sample. Therefore, the sample can be observed by detection of the fluorescence. An example of such a confocal optical scanner used in a confocal microscope is disclosed in JP-A-2011-85759.

This patent document discloses a so-called Nipkow disk type confocal optical scanner. The confocal optical scanner includes a pinhole disk and a condenser disk, where confocal openings (pinholes) are formed in the pinhole disk. When scanning a sample to acquire a confocal image, the confocal optical scanner rotates the pinhole disk and the condenser disk integrally with each other as a single pinhole unit. Here, the confocal optical scanner includes two different pinhole units, that is, a small-diameter pinhole unit having small-diameter pinholes and a large-diameter pinhole unit having large-diameter pinholes, which can be replaced with each other as needed.

The confocal optical scanner disclosed in the above patent document includes a direct-acting slider that is able to move both the small-diameter pinhole unit and the large-diameter pinhole unit. In other words, the confocal optical scanner can be controlled to select one of the pinhole units so that the selected one has a pinhole diameter appropriate for the numerical aperture (NA) of an objective lens. Therefore, optical conditions of a confocal microscope, such as resolution and brightness of a confocal image, can be optimized according to optical characteristics, such as numerical aperture (NA) and magnification ratio of an objective lens.

SUMMARY

A confocal optical scanner according to a first aspect of the present embodiment includes: a plurality of condenser elements each configured to concentrate illumination light to be applied on a sample to produce fluorescence from the sample; a plurality of optical scanning units including a plurality of openings each configured to allow the illumination light concentrated by the condenser element to pass through the opening, the optical scanning units each configured to scan the sample with the illumination light that has passed through the opening; a moving mechanism configured to move the optical scanning units to select one of the optical scanning units; and an incident-angle adjusting part configured to adjust the incident angle of the illumination light incident on the optical scanning unit selected from the optical scanning units according to the selected optical scanning unit.

DETAILED DESCRIPTION

Figure 1:
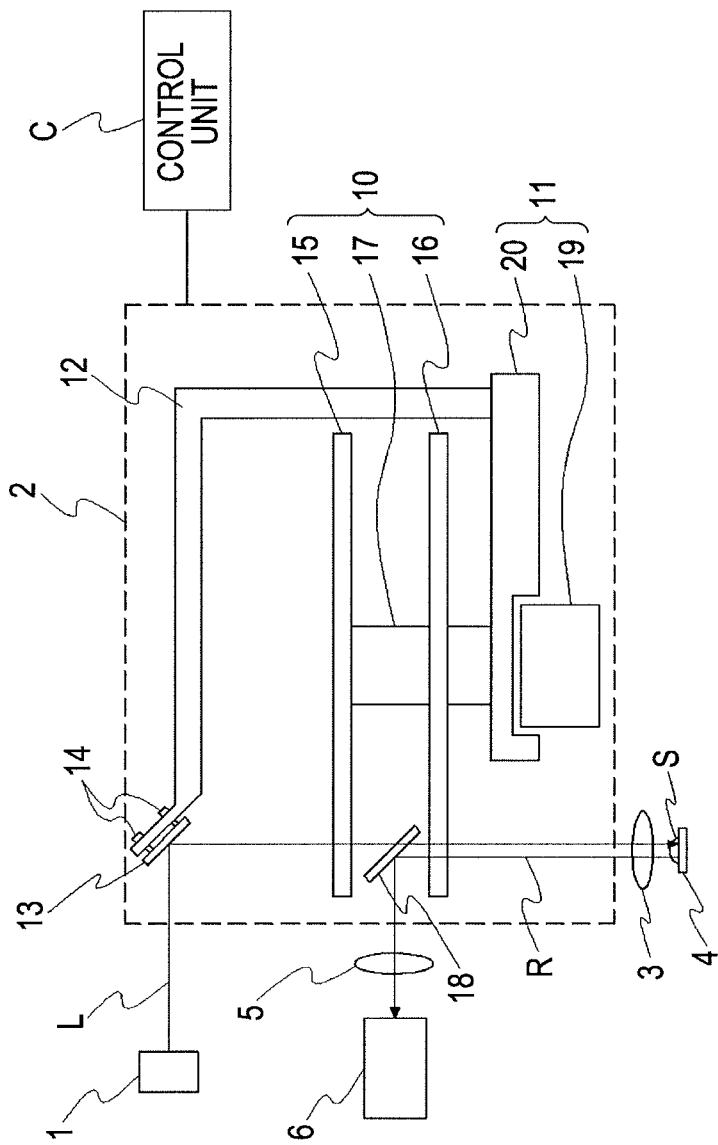
FIG. 1 is a front view of an exemplary microscope apparatus according to the present embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As described above, the confocal optical scanner disclosed in JP-A-2011-85759 is of a so-called Nipkow disk type. This type of confocal optical scanner is able to scan a sample at higher speed than one using a reciprocating mirror such as a galvanometer mirror. Furthermore, depending on objective lens magnification, the confocal optical scanner of the above patent document is able to select a pinhole disk provided with suitable pinholes. Therefore, selection of a suitable pinhole disk leads to extremely advantageous effect in that it allows a confocal microscope equipped with such a confocal optical scanner to give a confocal image having high S/N ratio and high resolution with high efficiency of utilization of illumination light.

Figure 11:
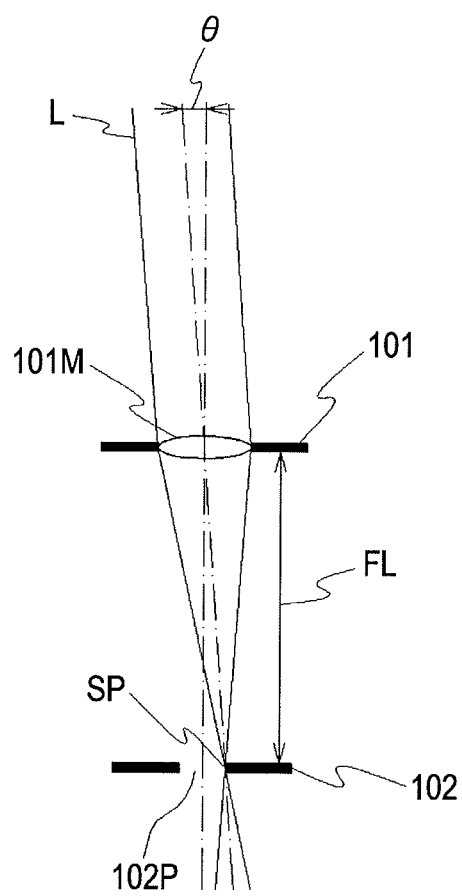
FIG. 11 is a schematic diagram illustrating relationship between illumination light and a condensing spot.

FIG. 11 illustrates a state where illumination light is concentrated on a pinhole through an objective lens. A plurality of objective lenses (microlenses) 101M is arranged on a condenser disk 101. Each microlens 101M has condensing effect. The condensing effect of the microlens 101M can cause illumination light L to be concentrated on a pinhole 102P arranged in a pinhole disk 102 to form a condensing spot SP. When the center of the condensing spot SP and the center of the pinhole 102P are matched, a confocal image having the best S/N ratio and high resolution can be obtained. On the contrary, the more the condensing spot SP shifts from the center of the pinhole 102P, the more the S/N ratio of a confocal image decreases due to generation of light quantity loss.

In the configuration illustrated in FIG. 11, for example, the pinhole 102P is designed to have the diameter of 50 μm and the microlens 101M is designed to have the focal length FL of 14 mm. In this case, positional displacement of the condensing spot SP from the pinhole 102P should be set to about 1/20 or less of the diameter of the pinhole 102P (i.e., 2.5 μm or less) in order to suppress light quantity loss to 10% or less. In other words, the incident angle θ of the illumination light L incident on the microlens 101M should be adjusted with very high precision. In particular, the incident angle θ should be not more than 0.01 degrees (=Arctan (2.5 μm/14 mm)).

In the confocal optical scanner disclosed in JP-A-2011-85759, as described above, the pinhole units can be replaced with each other depending on the numerical aperture (NA) of an objective lens. Therefore, a pinhole unit having a pinhole diameter appropriate for the numerical aperture (NA) of an objective lens can be selected. As a result, optical conditions (e.g., resolution, brightness, and the like of a confocal image) of the confocal optical scanner can be optimized. Furthermore, the pinhole units are movable by a moving mechanism.

Here, it should be noted that variation in the angle to mount the pinhole units may occur due to straightness of the moving mechanism, variation in accuracy of processing external form of the pinhole units, and so on. Furthermore, it may be difficult to adjust the above incident angle θ. That is, when optimally adjusting the incident angle θ of the irradiation light incident on one of two pinhole units to not more than 0.01 degrees, the incident angle θ of the irradiation light L incident on the other of two pinhole units may not be optimally adjusted. In other words, the incident angle θ of the illumination light L incident on the other of two pinhole units may exceed 0.01 degrees. Therefore, the adjustment may not be optimally performed for all of the pinhole units.

Therefore, an embodiment described in this specification intends to use a confocal optical scanner capable of selecting one of optical scanning units to always optimize the incident angle of illumination light incident on the selected optical scanning unit.

A confocal optical scanner according to a first aspect of the present embodiment includes: a plurality of condenser elements each configured to concentrate illumination light to be applied on a sample to produce fluorescence from the sample; a plurality of optical scanning units including a plurality of openings each configured to allow the illumination light concentrated by the condenser element to pass through the opening, the optical scanning units each configured to scan the sample with the illumination light that has passed through the opening; a moving mechanism configured to move the optical scanning units to select one of the optical scanning units; and an incident-angle adjusting part configured to adjust the incident angle of the illumination light incident on the optical scanning unit selected from the optical scanning units according to the selected optical scanning unit.

In the confocal optical scanner, an incident-angle controlling part controls the incident angle of illumination light according to the selected optical scanning unit. In other words, the incident angle of illumination light incident on the optical scanning unit to be used can be optimally adjusted by the incident-angle controlling part. Therefore, the confocal optical scanner can select a suitable optical scanning unit according to the numerical aperture (NA) of an objective lens and give a confocal image having high S/N ratio and high resolution.

Furthermore, a confocal optical scanner according to a second aspect of the present embodiment is the confocal optical scanner according to the first aspect, further including: a reflective mirror provided for each of the optical scanning units, where the reflective mirror is secured on the moving mechanism and configured to reflect the illumination light to the optical scanning unit; and a mirror adjusting part provided for each of the optical scanning units as the incident-angle adjusting part, where the mirror adjusting part is secured on the moving mechanism and configured to adjust the angle of the reflective mirror.

The reflective mirror is provided for each of the optical scanning units, and the angle of the reflective mirror is adjusted by the mirror adjusting part according to the optical scanning unit. The reflective mirror and the mirror adjusting part are secured on the moving mechanism. Thus, even if the reflective mirror and the mirror adjusting part are moved by the moving mechanism to select one optical scanning unit, no change occurs in relative relationship of the selected optical scanning unit to the reflective mirror and the mirror adjusting part. Therefore, the incident angle can be optimally adjusted according to the selected optical scanning unit.

Furthermore, a confocal optical scanner according to a third aspect of the present embodiment is the confocal optical scanner according to the first aspect, further including: a reflective mirror provided for each of the optical scanning units and configured to reflect the illumination light to the optical scanning unit; a mirror adjusting part provided for each of the optical scanning units as the incident-angle adjusting part and configured to adjust the angle of the reflective mirror; and a mirror switching part configured to switch one reflective mirror to another reflective mirror according to the selected optical scanning unit.

Although the reflective mirror may be of a fixed type, the reflective mirror may be switched to one for the selected optical scanning unit by the mirror switching part to optimally adjust the incident angle of illumination light incident on the optical scanning unit to be used.

Furthermore, a confocal optical scanner according to a fourth aspect of the present embodiment is the confocal optical scanner according to the first aspect, further including: one reflective mirror configured to reflect the illumination light to the optical scanning unit; and a mirror driving part configured to change and adjust the angle of the reflective mirror according to the selected optical scanning unit.

Changing the angle of the reflective mirror by the mirror driving part allows illumination light to be reflected at an optimal angle according to the selected optical scanning unit. Therefore, the incident angle of illumination light incident on the optical scanning unit to be used can be optimally adjusted and the number of reflective mirrors to be used can be reduced.

Furthermore, a confocal optical scanner according to a fifth aspect of the present embodiment is the confocal optical scanner according to the first aspect, where the incident-angle adjusting part includes an acousto-optic element, where the acousto-optic element is configured to change the traveling direction of the illumination light by diffracting the illumination light according to the selected optical scanning unit.

The acousto-optic element can diffract incident illumination light to change the traveling direction of the transmitted illumination light. Therefore, the incident angle of illumination light incident on the optical scanning unit to be used can be optimally adjusted.

Furthermore, a confocal optical scanner according to a sixth aspect of the present embodiment is the confocal optical scanner according to the first aspect, where the incident-angle adjusting part includes an angle adjusting part for optical scanning unit, where the angle adjusting part for optical scanning unit is configured to adjust the angle to arrange the optical scanning unit with respect to the illumination light according to the selected optical scanning unit.

The incident angle of illumination light incident on the optical scanning unit may be adjusted by adjusting the angle to arrange the optical scanning unit instead of directly adjusting the illumination light. In other words, the illumination light and the optical scanning unit may be only in optimal relationship with each other, and therefore the angle to arrange the optical scanning unit may be adjusted for this purpose.

Furthermore, a confocal optical scanner according to a seventh aspect of the present embodiment is the confocal optical scanner according to the first aspect, further including a half mirror configured to combine a plurality of rays of the illumination light each having the incident angle adjusted for each of the optical scanning units, where among the plurality of rays of the illumination light, a ray of illumination light according to the selected optical scanning unit is incident on the optical scanning unit.

The half mirror is employed to combine a plurality of rays of illumination light each having the incident angle adjusted to an optimal incident angle for each of the optical scanning units. Thus, illumination light according to the selected optical scanning unit can be used. Therefore, illumination light can be incident on the optical scanning unit at an optimal angle.

Furthermore, a confocal optical scanner according to an eighth aspect of the present embodiment is the confocal optical scanner according to the first aspect, where the optical scanning unit includes: a condenser disk having the condenser elements spirally arranged in a multiple-thread pattern; a pinhole disk having pinholes as the openings, where the pinholes are arranged in the same pattern as the condenser elements; and a connection rotary motor configured to integrally rotate the condenser disk and the pinhole disk.

The optical scanning unit is applicable to a so-called Nipkow disk type confocal optical scanner. Therefore, a confocal image can be produced at high speed simultaneously with obtaining the aforementioned effect.

A confocal microscope according to a ninth aspect of the present embodiment is a confocal microscope having any one of the confocal optical scanners according to the first to eighth aspects, the confocal microscope including: the confocal optical scanner, a light source configured to emit the illumination light, and a detection unit configured to detect the fluorescence as return light.

Therefore, the confocal microscope can select a suitable optical scanning unit according to the numerical aperture (NA) of an objective lens and give a confocal image having high S/N ratio and high resolution.

According to the first to ninth aspects, the incident-angle controlling part controls the incident angle of illumination light according to the selected optical scanning unit. Because the incident angle of illumination light can be controlled, the confocal microscope can optimally adjust the incident angle of the illumination light incident on the optical scanning unit to be used. Therefore, the confocal microscope can select a suitable optical scanning unit according to the numerical aperture (NA) of an objective lens and give a confocal image having high S/N ratio and high resolution.

Hereinafter, the present embodiment will be described. FIG. 1 depicts an exemplary confocal microscope according to the embodiment. The confocal microscope includes a light source 1, a confocal optical scanner 2, an objective lens 3, a dish 4, an imaging lens 5, and a camera 6. Furthermore, the confocal optical scanner 2 is connected to a control unit C. The light source 1 emits illumination light L. The illumination light L has a wavelength that excites a sample S as an observing object which is mounted on the dish 4. Here, the emitted illumination light L is collimated light (parallel light). Alternatively, the illumination light L may be converted into parallel light by a collimator lens (not shown).

The confocal optical scanner 2 is a scanning section for scanning the sample S mounted on the dish 4 by using the illumination light L. The objective lens 3 concentrates the illumination light L on the sample S mounted on the dish 4. The illumination light L concentrated on the sample S excites a fluorescent material in the sample S to generate fluorescence from the sample S. The fluorescence acts as return light R and is incident on the objective lens 3, followed by entering the confocal optical scanner 2.

Subsequently, the return light R is reflected on a dichroic mirror 18 and then output from the confocal optical scanner 2. The imaging lens 5 focuses the return light R from the confocal optical scanner 2 onto the camera 6. The camera 6 functions as a detection unit that carries out photoelectric conversion of light quantity of the return light R to generate image data. Based on the light quantity data of the return light R, which has been received by the camera 6, predetermined image processing is performed to generate an image of the sample S. Here, the control unit C is a computer or the like that controls each part of the confocal optical scanner 2.

As depicted in FIG. 1, the confocal optical scanner 2 includes an optical scanning unit 10, a moving mechanism 11, a mirror holder 12, a mirror 13, and a mirror adjusting part 14. The optical scanning unit 10 includes a condenser disk 15, a pinhole disk 16, a connection rotary motor 17, and a dichroic mirror 18. Furthermore, the moving mechanism 11 includes a holding part 19 and a movable part 20.

Figure 2:
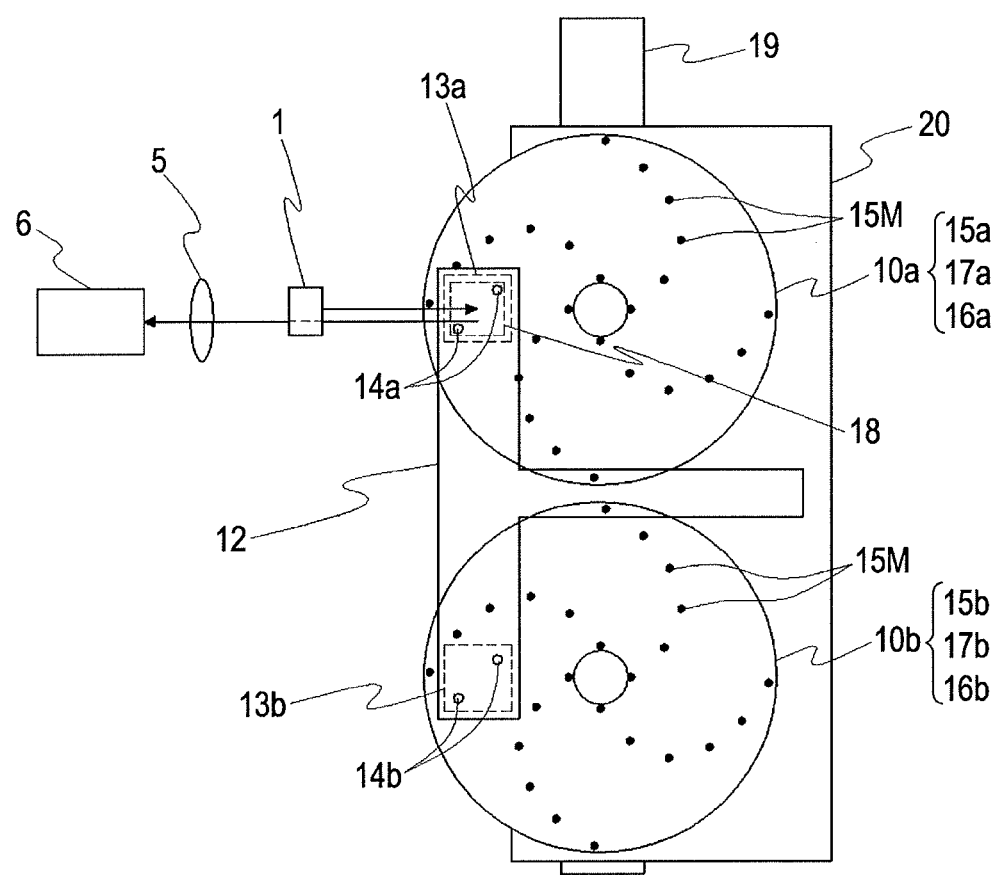
FIG. 2 is a top view of the exemplary microscope apparatus according to the present embodiment.

As depicted in FIG. 2, the condenser disk 15 is a disk-like rotary disk. On this condenser disk 15, a plurality of condenser elements (microlens) 15M is spirally arranged in a multiple-thread pattern. On the other hand, the pinhole disk 16 is a disk-like rotary disk. A plurality of pinholes 16P (not shown) is formed in the pinhole disk 16 and spirally arranged in a multiple-thread pattern. The pattern to arrange the condenser elements 15M on the condenser disk 15 is almost the same as the pattern to arrange the pinholes 16P on the pinhole disk 16.

The condenser element 15M concentrates the incident illumination light L on the pinhole 16P. In other words, the condenser elements 15M of the condenser disk 15 and the pinholes 16P of the pinhole disk 16 are positionally related to each other. Therefore, the illumination light L incident on the condenser element 15M is concentrated on the corresponding pinhole 16P. The condenser disk 15 and the pinhole disk 16 are rotatably connected to each other via the connection rotary motor 17. Rotation of the connection rotary motor 17 allows the condenser disk 15 and the pinhole disk 16 to rotate integrally with each other.

The dichroic mirror (beam splitter) 18 is an optical element that reflects light with the specific wavelength (i.e., fluorescence of the sample S (return light R)) but transmits light with other wavelengths (i.e., illumination light L). The dichroic mirror 18 is disposed in a space formed between the condenser disk 15 and the pinhole disk 16. Therefore, these structural elements form the optical scanning unit 10.

As depicted in FIG. 2, the confocal optical scanner 2 includes a first optical scanning unit 10a and a second optical scanning unit 10b. Here, an illustrated example includes two optical scanning units, but the present embodiment is not limited thereto. For example, the confocal optical scanner 2 may have three or more optical scanning units, and one optical scanning unit may be selected from these optical scanning units. In the confocal optical scanner 2 of the present embodiment, furthermore, the first optical scanning unit 10a differs from the second optical scanning unit 10b. Here, in the illustrated example, the opening area of the pinhole 16P of one unit differs from that of another unit. In other words, in the confocal optical scanner 2 of the present embodiment, the pinholes 16P of the first optical scanning unit 10a have larger opening area (i.e., larger diameter) and the pinholes 16P of the second optical scanning unit 10b have smaller opening area (i.e., smaller diameter). Needless to say, their opening area size may be opposite. However, it is noted that the configuration of the confocal optical scanner 2 is not limited to one described above. For example, the condenser elements 15M and the pinholes 16P may be arranged in different patterns.

In the present embodiment, one of the first optical scanning unit 10a and the second optical scanning unit 10b is selected. This selection is performed based on the numerical aperture (NA) of the objective lens 3.

The moving mechanism 11 is an optical scanning unit moving mechanism that is configured to move the optical scanning unit 10. The moving mechanism 11 includes the holding part 19 and the movable part 20. The holding part 19 is a guide rail or the like that guides the movable part 20 during movement of the movable part 20. The movable part 20 includes a movable member such as a ball screw or a linear motor, so that it is slidably secured on the holding part 19. Movement of the movable part 20 allows either the first optical scanning unit 10a or the second optical scanning unit 10b to be selected.

As depicted in FIG. 2, the movable part 20 includes a table on which both the first optical scanning unit 10a and the second optical scanning unit 10b can be mounted. The table itself is configured to be movable. Furthermore, the movable part 20 includes the mirror holder 12, which is a means for holding the mirror 13. As viewed from the front side, the mirror holder 12 is of an approximately L shape and secured on the table of the movable part 20.

The mirror 13 is a reflective mirror. This mirror 13 is disposed at a position at which illumination light L from the light source 1 is reflected. That is, the illumination light L is reflected on the mirror 13 at the angle of 90 degrees or about 90 degrees. The mirror 13 is provided with the mirror adjusting part 14 for adjusting the angle to arrange the mirror 13. The mirror adjusting part 14 may be an adjustment screw or the like. The mirror adjusting part 14 is employed to change the angle to arrange the mirror 13, and therefore the reflection angle of the mirror 13 can be changed. Therefore, the traveling direction of the illumination light L after reflection on the mirror 13 can be changed. Alternatively, the mirror 13 may be a reflecting prism.

As depicted in FIG. 2, the mirror holder 12 is of an approximately T shape as viewed from the top side. A first end portion of the mirror holder 12 is provided with a first mirror 13a and a first mirror adjusting part 14a. On the other hand, a second end portion of the mirror holder 12 is provided with a second mirror 13b and a second mirror adjusting part 14b. The first mirror 13a and the first mirror adjusting part 14a are provided for the first optical scanning unit 10a. On the other hand, the second mirror 13b and the second mirror adjusting part 14b are provided for the second optical scanning unit 10b.

Next, operation of the confocal microscope configured as described above is described. First, among the pinholes 16P formed in the pinhole disk 16, a pinhole 16P having the opening area suitable for the numerical aperture (NA) of the objective lens 3 shown in FIG. 1 is selected. Therefore, the pinhole 16P is selected for optimization of optical conditions, such as resolution and brightness of a confocal image, of the confocal microscope. As a result, a confocal image having high S/N ratio and high resolution can be obtained.

More specifically, first, either the first optical scanning unit 10a or the second optical scanning unit 10b, which are illustrated in FIG. 2, is selected. In other words, the optical scanning unit 10 having pinholes 16P suitable for the numerical aperture (NA) of the objective lens 3 is selected. Here, the optical scanning unit 10 having pinholes 16P suitable for the numerical aperture (NA) of the objective lens 3 is, but not limited to, the first optical scanning unit 10a (a unit having pinholes 16P of large diameter).

Next, irradiation light L is introduced into the selected pinhole 16P. That is, the control unit C controls the moving mechanism 11 to move the movable part 20 along the holding part 19. Movement of the movable part 20 allows illumination light L from the light source 1 to be incident on the first optical scanning unit 10a, and then allows the camera 6 to receive return light R from the first optical scanning unit 10a. In this state, illumination light L is emitted from the light source 1 to the first optical scanning unit 10a. The illumination light L is reflected on the first mirror 13a of the first optical scanning unit 10a and then captured by the condenser element 15M on the condenser disk 15. Subsequently, the condenser element 15M concentrates the illumination light L on the corresponding pinhole 16P of the pinhole disk 16.

The illumination light L that has passed through the pinhole 16P comes into focus on a sample S on the dish 4 by the objective lens 3. As a result, the illumination light L excites the sample S to produce fluorescence from the sample S. The fluorescence is incident as return light R on the objective lens 3. Furthermore, the return light R passes through the pinhole 16P and then travels to the dichroic mirror 18 disposed between the condenser disk 15 and the pinhole disk 16.

The dichroic mirror 18 has optical characteristics of transmitting light with the wavelength of the illumination light L and reflecting light with the wavelength of the fluorescence (return light R). Thus, the dichroic mirror 18 reflects the return light R. Subsequently, the reflected return light R is incident on the imaging lens 5. The return light R that has passed through the imaging lens 5 forms an image on the camera 6. The camera 6 obtains light quantity data by converting quantity of light on the area where the return light R forms an image into an electrical signal by photoelectric conversion.

As illustrated in FIG. 2, the connection rotary motor 17 allows the condenser disk 15 and the pinhole disk 16 to rotate integrally with each other. The condenser disk 15 includes a number of condenser elements 15M that are spirally arranged in a multiple-thread pattern. On the other hand, the pinhole disk 16 has the pinholes 16P arranged in a pattern similar to that of the condenser elements 15M.

In other words, the condenser disk 15 and the pinhole disk 16 rotate integrally with each other to allow a predetermined area of the sample S to be scanned by the illumination light L at high speed. The return light R from the sample S, which is generated during scanning of the sample S with the illumination light L, is captured by the camera 6, and then converted into light quantity data as information on the predetermined area of the scanned sample S. Therefore, based on this light quantity data, an image of the predetermined area of the sample S is produced at high speed. Here, the connection rotary motor 17 is controlled by the control unit C.

In the present embodiment, the illumination light L and the return light R pass through the pinhole 16P. This means that light on areas other than the focal surface of the sample S is excluded. Therefore, a confocal image having high resolution in the optical axis direction can be produced. Here, an image having good optical characteristics (i.e., high S/N ratio and high resolution) is produced by selecting the first optical scanning unit 10a having pinholes 16P with the opening area suitable for the objective lens 3. However, the present embodiment is not limited to the first optical scanning unit 10a. That is, depending on the numerical aperture (NA) of the objective lens 3, the pinholes 16P of the second optical scanning unit 10b may be suitable.

In a case of using the pinholes 16P of the second optical scanning unit 10b, the movable part 20 of the moving mechanism 11 is moved, and the second optical scanning unit 10b is selected. In other words, the second optical scanning unit 10b is moved to a position corresponding to the light source 1 and the camera 6.

As depicted in FIG. 2, incidentally, the movable part 20 of the moving mechanism 11 includes the first mirror 13a and the first mirror adjusting part 14a for the first optical scanning unit 10a. The movable part 20 of the moving mechanism 11 also includes the second mirror 13b and the second mirror adjusting part 14b for the second optical scanning unit 10b. Furthermore, the movable part 20 includes the first optical scanning unit 10a and the second optical scanning unit 10b as well as the mirror holder 12.

Therefore, positional relationship between the first optical scanning unit 10a and the first mirror 13a is kept constant. Similarly, positional relationship between the second optical scanning unit 10b and the second mirror 13b is also kept constant. Furthermore, the first mirror adjusting part 14a adjusts the angle of the first mirror 13a so that the incident angle $\theta$ of illumination light L incident on the first optical scanning unit 10a (hereinafter, this angle is referred to as angle $\theta a$) is within a predetermined angle range. Similarly, the second mirror adjusting part 14b adjusts the angle of the second mirror 13b so that the incident angle $\theta$ of illumination light L incident on the second optical scanning unit 10b (hereinafter, this angle is referred to as angle $\theta b$) is within a predetermined angle range.

Therefore, the first mirror adjusting part 14a and the second mirror adjusting part 14b serve as incident-angle adjusting parts configured to adjust the incident angle of illumination light L incident on the optical scanning unit 10. The first mirror adjusting part 14a and the second mirror adjusting part 14b can independently adjust the angle of the corresponding mirrors.

When the first optical scanning unit 10a is selected, illumination light L from the light source 1 is reflected by the first mirror 13a. In this case, the reflection angle of the first mirror 13a determines the incident angle $\theta a$ of the illumination light L incident on the condenser element 15M of the condenser disk 15. The incident angle $\theta a$ determines a position of a condensing spot SP on the pinhole 16P at which the illumination light L is concentrated by the condenser element 15M.

As described above, the closer the condensing spot SP is located to the center of the pinhole 16P, the lower light quantity loss becomes. Ideally, when the condensing spot SP and the center of the pinhole 16P are completely matched, maximum decrease in light quantity loss of illumination light L occurs. It is desired that the light quantity loss of the illumination light L be within a predetermined acceptable range. In other words, as described above, if an acceptable level of the light quantity loss is set to 10% or less, the above incident angle $\theta a$ should be 0.01 degrees or less.

Hence, the first mirror adjusting part 14a adjusts the reflection angle of the first mirror 13a to make the incident angle $\theta a$ satisfy such a requirement. The traveling direction of the illumination light L is therefore adjusted to allow for incidence of the illumination light L on the condenser disk 15 at the incident angle $\theta a$ suitable for the first optical scanning unit 10a. As a result, the above requirement can be satisfied and an image having high S/N ratio and high resolution can be produced.

The first mirror adjusting part 14a serves as an incident-angle controlling part for adjusting the reflection direction of illumination light L. In other words, the first mirror adjusting part 14a serves as a light-diverting means for adjusting the traveling direction of illumination light L. Similarly, the second mirror adjusting part 14b also serves as such an incident-angle controlling part (i.e., light-diverting means).

As depicted in FIG. 2, the first mirror adjusting part 14a includes at least two screws disposed behind the reflection surface of the first mirror 13a. When the first mirror adjusting part 14a is selected, these screws are adjusted to adjust the angle of the reflection surface of the first mirror 13a. Therefore, illumination light L can be incident on the condenser disk 15 at an optimal incident angle $\theta a$ particular to the first optical scanning unit 10a.

On the other hand, when the second optical scanning unit 10b is selected, the moving mechanism 11 moves the second optical scanning unit 10b to a predetermined position under control of the control unit C. Here, the predetermined position is a position where illumination light L from the light source 1 is incident on the second optical scanning unit 10b, and return light R from the second optical scanning unit 10b is allowed to be received by the camera 6. At this time, the second mirror adjusting part 14b adjusts the reflection angle of the second mirror 13b particular to the second optical scanning unit 10b. That is, the second mirror adjusting part 14b includes at least two screws disposed behind the reflection surface of the second mirror 13b. When the second mirror adjusting part 14b is selected, these screws are adjusted to adjust the angle of the reflection surface of the second mirror 13b. By adjusting the reflection angle of the second mirror 13b, illumination light L can be incident on the second optical scanning unit 10b at an optimum incident angle $\theta b$. Therefore, an image having high S/N ratio and high resolution can be produced.

The moving mechanism 11 can appropriately select either the first optical scanning unit 10a or the second optical scanning unit 10b as the optical scanning unit 10 depending on the numerical aperture (NA) of the objective lens 3. The first optical scanning unit 10a is provided with the first mirror 13a having the adjusted reflection angle. The second optical scanning unit 10b is provided with the second mirror 13b having the adjusted reflection angle.

As described above, the first optical scanning unit 10a and the second optical scanning unit 10b may respectively have a different mounting angle. Such difference stems from variation in accuracy of processing external form of the optical scanning unit 10 and the moving mechanism 11, variation in straightness of the moving mechanism 11, and so on. Furthermore, even if the moving mechanism 11 is adjusted to obtain an optimum incident angle $\theta$ of illumination light L incident on one optical scanning unit 10, the incident angle $\theta$ of illumination light L incident on another optical scanning unit 10 is not always optimal.

However, by adopting the above configuration of the confocal scanner according to the present embodiment, light quantity loss of illumination light L can be suppressed even if the moving mechanism 11 changes the first optical scanning unit 10a to the second optical scanning unit 10b or vice versa. Therefore, an image having high S/N ratio and high resolution can be produced.

Here, the incident angle $\theta$ is assumed to be optimal when the incident angle $\theta$ of irradiation light L suppresses light quantity loss of illumination light L to 10% or less. Under the aforementioned conditions, for example, the optimal incident angle θ is 0.01 degrees or less. However, the present embodiment is not limited to such an incident angle. The optimal incident angle θ may be arbitrarily changed based on an allowable range of light quantity loss, which is suitably determined. For example, if an allowable range of the light quantity loss is 20% or less, an allowable range of the incident angle θ of illumination light L will become larger. Furthermore, if an allowable range of the light quantity loss is 5% or less, an allowable range of the incident angle θ of illumination light L will become smaller.

The pinhole disk 16 has been described above as one having pinholes 16P spirally arranged in a multiple-thread pattern. However, the present embodiment is not limited to the pinhole disk 16 having such a configuration. The pinholes (confocal openings) 16P may be designed in any shape, arrangement, and so on as long as it can acquire confocal sectioning effect. For example, a slit disk having a plurality of slit-shaped confocal openings may be used. Alternatively, a Tony Wilson disk (disk using intensity modulation for encoding) or the like may be used as a confocal disk.

As described above, the confocal optical scanner 2 of the present embodiment includes a plurality of condenser elements 15M and a plurality of pinholes 16P and simultaneously scans a plurality of points on a sample to generate a confocal image at high speed. Therefore, as long as a plurality of points on a sample can be simultaneously scanned to generate a confocal image at high speed, the configuration of the confocal optical scanner 2 can be arbitrarily changed. For example, an optical scanning unit where the condenser elements 15M and the pinholes 16P are formed on the same disk may be used.

Figure 3:
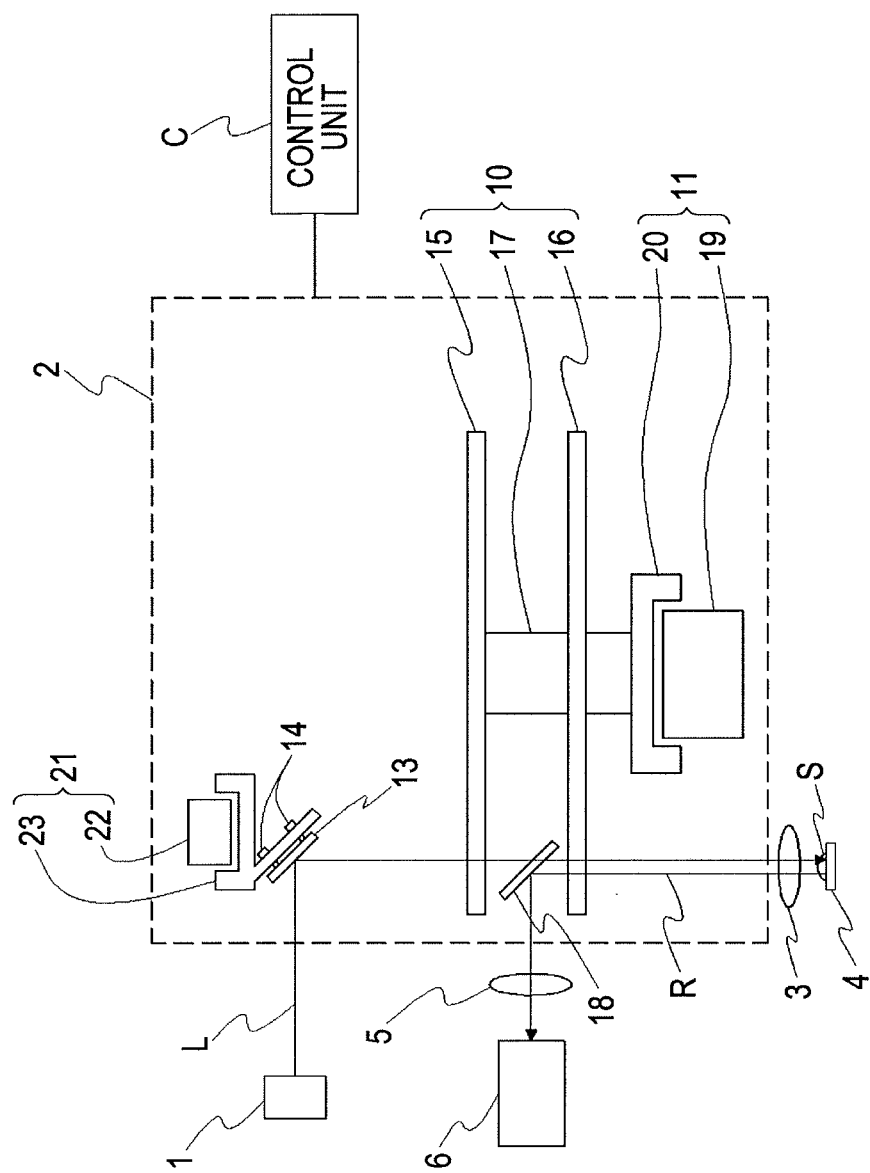
FIG. 3 is a front view of a microscope apparatus according to a first modified example.
Figure 4:
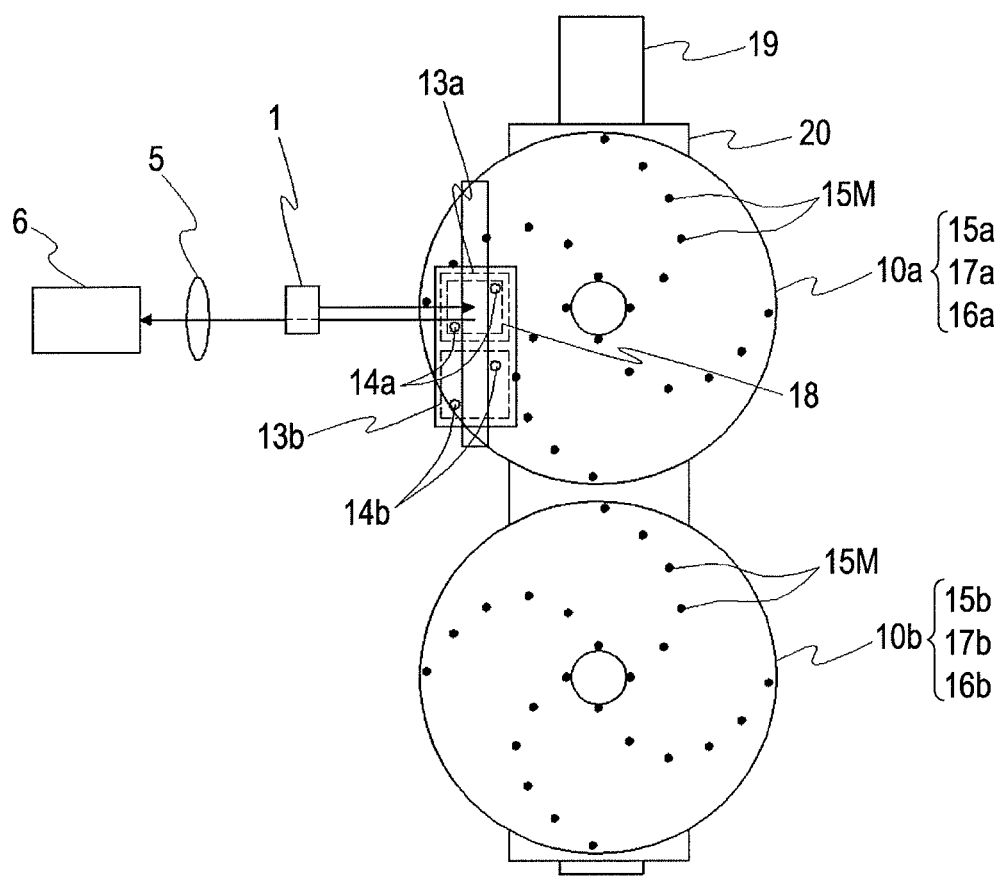
FIG. 4 is a top view of the microscope apparatus according to the first modified example.

Next, a first modified example (Modified Example 1) of the present embodiment is described. In Modified Example 1, as illustrated in FIG. 3 and FIG. 4, the confocal optical scanner 2 further includes a mirror switching part 21. The mirror switching part 21 includes a mirror holding part 22 and a mirror movable part 23. The mirror holding part 22 is a guide rail that guides the mirror movable part 23 that is able to shift its position. Therefore, the mirror holding part 22 guides the mirror movable part 23 to move it in the same direction as that of the optical scanning unit 10.

As depicted in FIG. 4, the first mirror 13a and the second mirror 13b are aligned and attached on the mirror holding part 22 in the longitudinal direction of the mirror holding part 22. The first mirror adjusting part 14a is attached to the first mirror 13a. On the other hand, the second mirror adjusting part Mb is attached to the second mirror 13b. Therefore, the angle of the first mirror 13a and the angle of the second mirror 13b can be adjusted independently from each other.

The control unit C controls the moving mechanism 11 to select either the first optical scanning unit 10a or the second optical scanning unit 10b. Furthermore, the angle of the first mirror 13a is adjusted with respect to the first optical scanning unit 10a. The angle of the second mirror 13b is adjusted with respect to the second optical scanning unit 10b.

Therefore, when the first optical scanning unit 10a is selected, the control unit C controls the mirror switching part 21 to move the mirror movable part 23. Then, the first mirror 13a is disposed at a position on which illumination light L from the light source 1 is reflected. On the other hand, when the second optical scanning unit 10b is selected, the control unit C controls the mirror switching part 21 to move the mirror movable part 23. Then, the second mirror 13b is disposed at a position on which illumination light L from the light source 1 is reflected.

As described above, the first mirror 13a and the second mirror 13b can be switched to each other according to the selected optical scanning unit 10. Subsequently, the first mirror 13a or the second mirror 13b is adjusted to optimize the incident angle θ of illumination light L incident on the optical scanning unit 10 to be used. As a result, an image having high S/N ratio and high resolution is produced.

Figure 5:
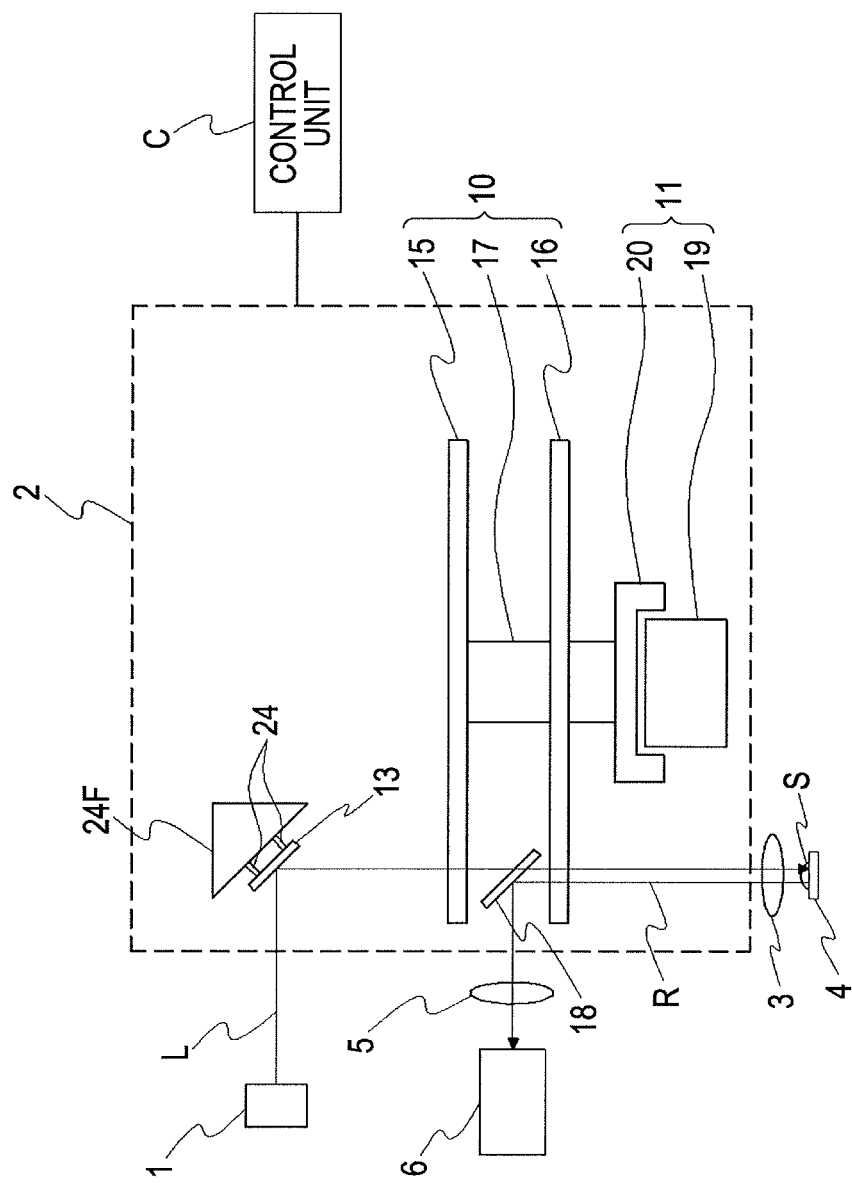
FIG. 5 is a front view of a microscope apparatus according to a second modified example.
Figure 6:
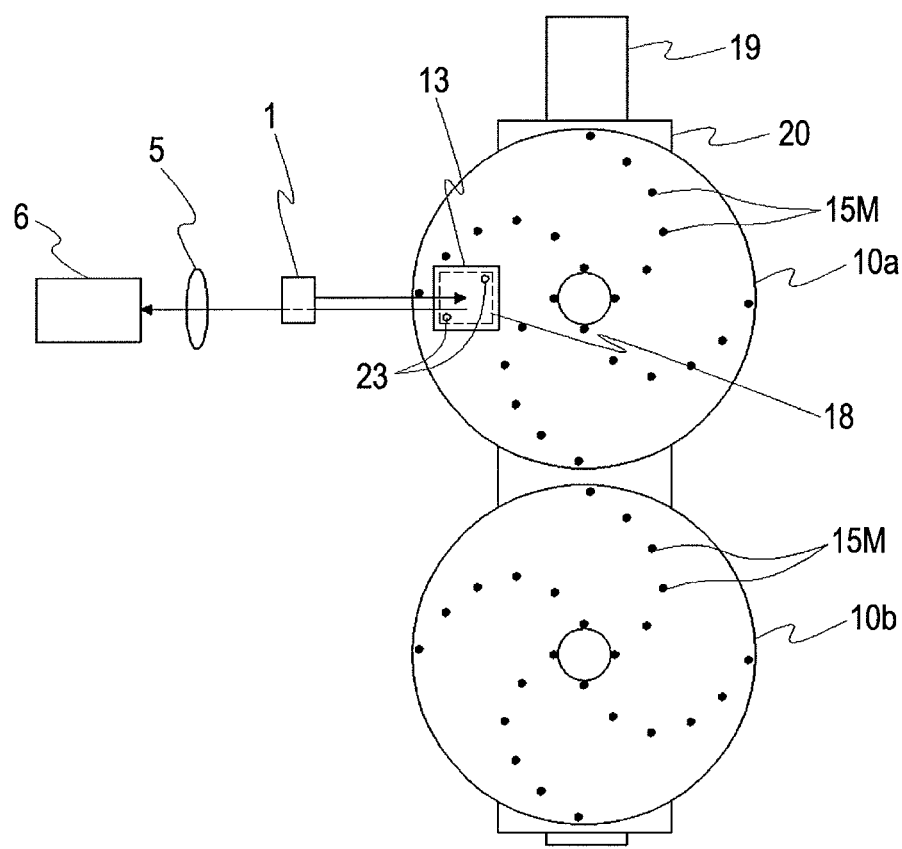
FIG. 6 is a top view of the microscope apparatus according to the second modified example.

Next, a second modified example (Modified Example 2) of the present embodiment is described. In Modified Example 2, as illustrated in FIG. 5 and FIG. 6, the confocal optical scanner 2 further includes a piezo actuator 24 and two piezo holding parts 24F. These piezo holding parts 24F are secured on the piezo actuator 24. The piezo actuators 24 adjust the angle of the mirror 13.

The piezo actuators 24 each include a piezoelectric element (piezo element). The piezo actuators 24 each serve as a mirror driving part that adjusts the angle of the mirror 13 using piezoelectric effect. The control unit C controls the piezo actuators 24. Specifically, the control unit C controls the moving mechanism 11 to select the first optical scanning unit 10. When the first optical scanning unit 10a is selected, then the control unit C adjusts the angle of the mirror 13 to a reflection angle suitable for the first optical scanning unit 10a. When the second optical scanning unit 10b is selected, then the control unit C adjusts the angle of the mirror 13 to a reflection angle suitable for the second optical scanning unit 10b.

Under control of such a control unit C, the angle of the mirror 13 is suitably adjusted to a reflection angle optimal for the selected optical scanning unit 10. Thus, the incident angle θ of illumination light L incident on the selected optical scanning unit 10 is adjusted to be optimal. Therefore, the confocal optical scanner 2 can produce an image having high S/N ratio and high resolution.

In Modified Example 2, the piezo actuators 24 are used as mirror driving parts. However, the mirror driving part is not limited to the piezo actuators 24. Alternatively, as long as the angle of the mirror 13 can be adjusted to be optimal, the mirror driving part may be a motor, a linear actuator, a galvanometer, or the like.

Figure 7:
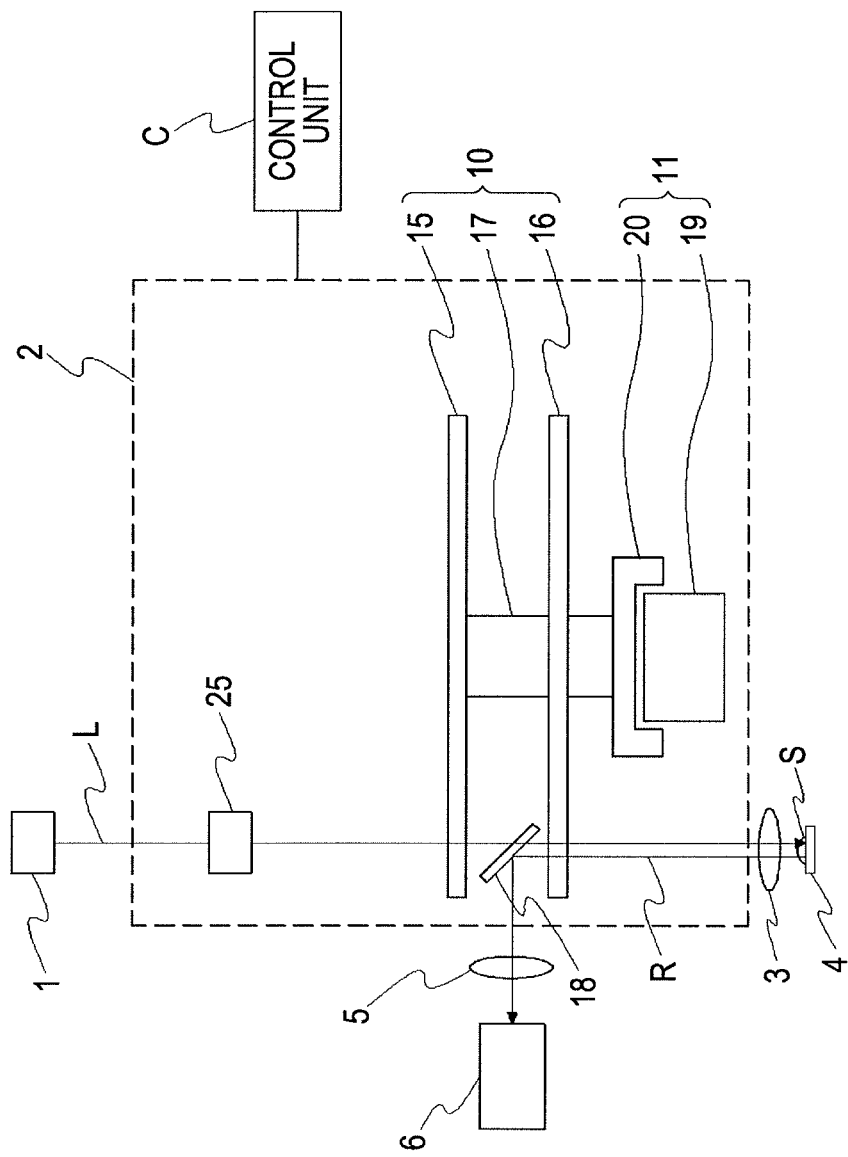
FIG. 7 is a front view of a microscope apparatus according to a third modified example.
Figure 8:
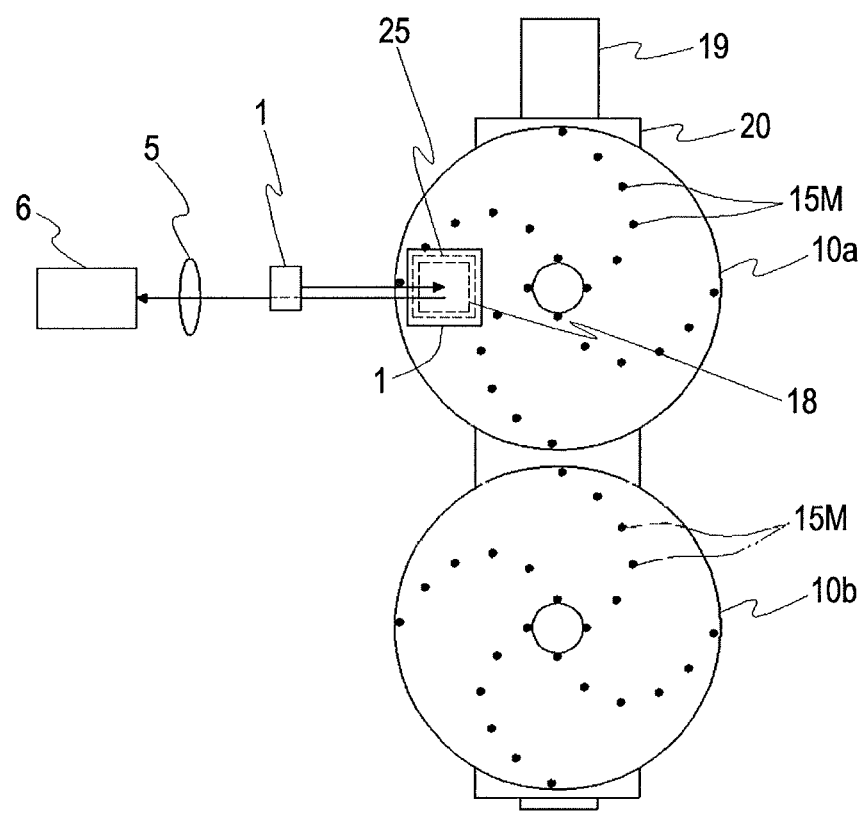
FIG. 8 is a top view of the microscope apparatus according to the third modified example.

Next, a third modified example (Modified Example 3) of the present embodiment is described. In Modified Example 3, as depicted in FIG. 7 and FIG. 8, the confocal optical scanner 2 includes an acousto-optic element 25. The acousto-optic element 25 is disposed in an optical path of illumination light L, and is under control of the control unit C. The acousto-optic element 25 is driven to cause diffraction of the illumination light L, changing the traveling direction thereof.

In the example of the embodiment, Modified Example 1, and Modified Example 2, which are described above, the confocal optical scanner 2 is of a reflection type that employs the mirror 13 to control the incident angle θ of illumination light L incident on the optical scanning unit 10. However, the confocal optical scanner 2 of Modified Example 3 is of a transmission type that allows illumination light L to pass through the acousto-optic element 25 and changes the traveling direction of the illumination light L to control the incident angle θ of the irradiation light L. Therefore, as illustrated in FIG. 7, the light source 1 is disposed at a position different from the example of the embodiment, Modified Example 1, and Modified Example 2.

As described above, the confocal optical scanner 2 of Modified Example 3 can adjust the incident angle θ of illumination light L incident on the selected optical scanning unit 10 to be optimal. As a result, an image having high S/N ratio and high resolution can be produced. As described above, the acousto-optic element 25 serves as a light-diverting means that can change the traveling direction of illumination light L. In Modified Example 3, therefore, the acousto-optic element 25 is used as a light-diverting means. According to the present embodiment, however, the light-diverting means is not limited to the acousto-optic element 25 of Modified Example 3. As long as the traveling direction of illumination light L can be changed, any of an electro-optic element, a magnetic optical element, and so on may be used.

Figure 9:
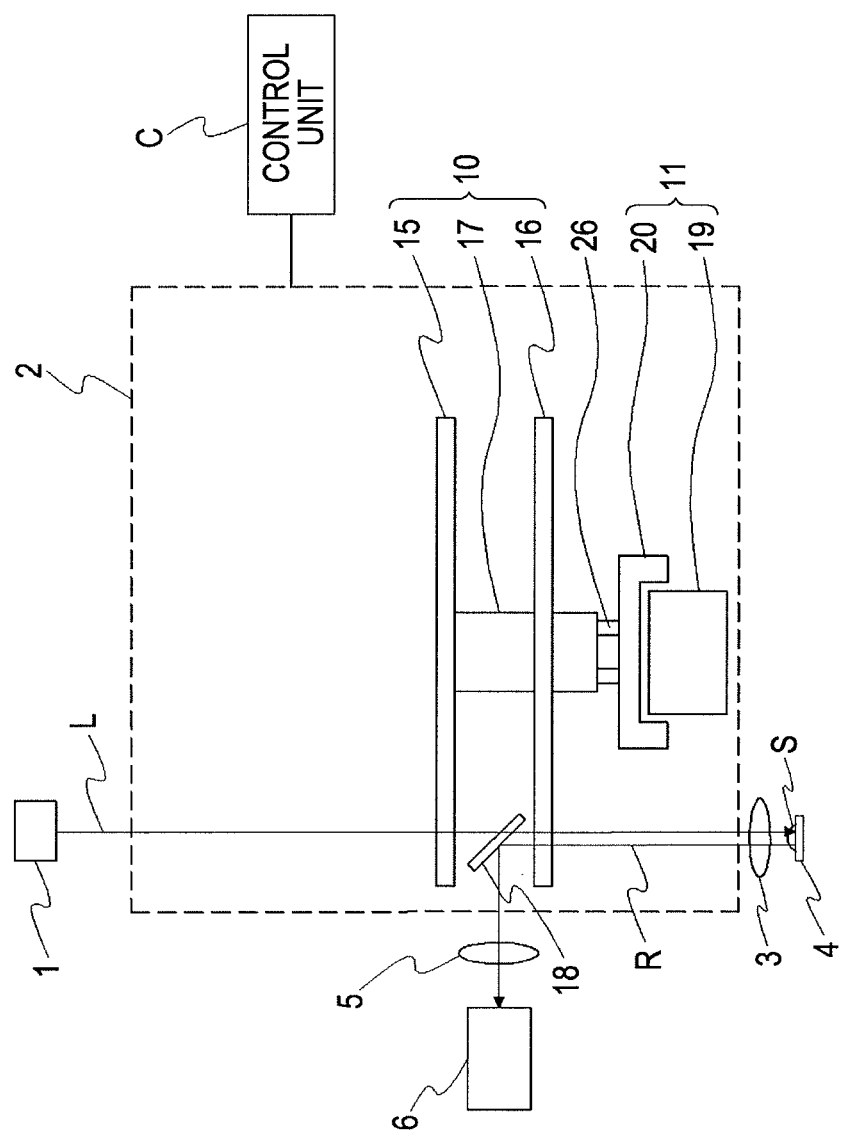
FIG. 9 is a front view of a microscope apparatus according to a fourth modified example.
Figure 10:
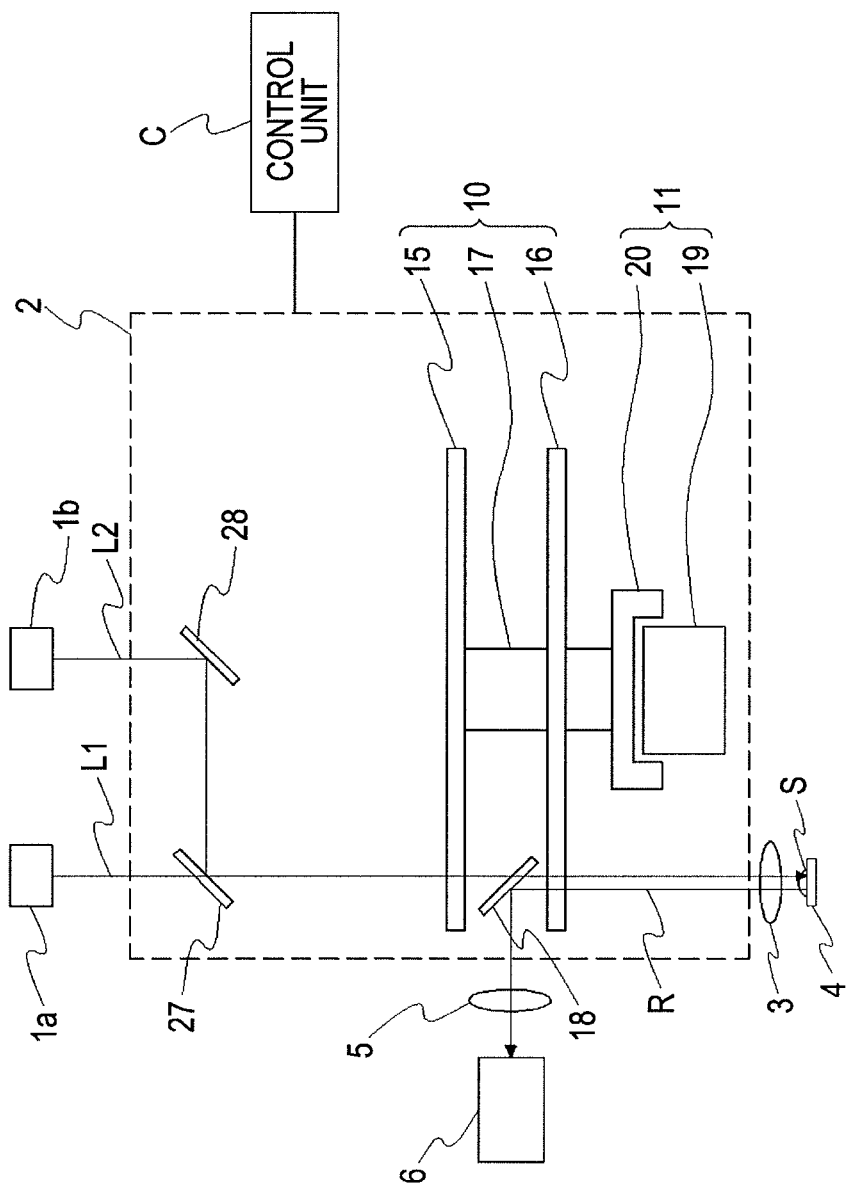
FIG. 10 is a front view of a microscope apparatus according to a fifth modified example.

Next, a fourth modified example (Modified Example 4) of the present embodiment is described. In Modified Example 4, as depicted in FIG. 9, the confocal optical scanner 2 includes an angle adjusting part for optical scanning unit 26. In the example of the embodiment, and Modified Examples 1 to 3, which are described above, the incident angle of illumination light L incident on the optical scanning unit is adjusted by changing the traveling direction of the irradiation light L. However, the present embodiment is not limited to such a configuration. Alternatively, the incident angle of illumination light L incident on the optical scanning unit may be adjusted by changing the angle of the optical scanning unit 10. The angle adjusting part for optical scanning unit 26 adjusts the angle of the optical scanning unit 10. An angle adjusting screw or the like can serve as the angle adjusting part for optical scanning unit 26.

In the confocal optical scanner 2 of Modified Example 4, when the first optical scanning unit 10a is selected, the angle adjusting part for optical scanning unit 26 adjusts the angle of the first optical scanning unit 10a. Furthermore, when the second optical scanning unit 10b is selected, the angle adjusting part for optical scanning unit 26 adjusts the angle of the second optical scanning unit 10b. Thus, no matter which of the first optical scanning unit 10a and the second optical scanning unit 10b is selected, the angle of the optical scanning unit 10 can be adjusted based on the selection. Therefore, the incident angle $\theta$ of illumination light L incident on the optical scanning unit 10 can be adjusted to be optimal. As a result, an image having high S/N ratio and high resolution can be produced.

In Modified Example 4, the angle adjusting part for optical scanning unit 26 is constructed of the angle adjusting screw. However, the angle adjusting part for optical scanning unit 26 is not limited to the angle adjusting screw. Alternatively, it may be any of movable mechanisms, such as a motor, a linear actuator, and a piezo actuator. When such a movable mechanism is used, the control unit C controls the movable mechanism to attain an optimal angle to place the optical scanning unit 10 depending on the selected optical scanning unit 10.

Next, a fifth modified example (Modified Example 5) is described. In this Modified Example 5, the confocal microscope includes two light sources 1a and 1b. In addition, the confocal optical scanner 2 is provided with a half mirror 27 and a mirror 28. The light source 1a emits illumination light L in the direction along which the incident angle $\theta a$ of the illumination light (L1) incident on the first optical scanning unit 10a can be optimized. The light source 1b emits illumination light L in the direction along which the incident angle $\theta b$ of the illumination light (L2) incident on the second optical scanning unit 10b can be optimized.

When the first optical scanning unit 10a is selected, the light source 1a emits illumination light L1. The illumination light L1 from the light source 1a passes through the half mirror 27 and then enters the first optical scanning unit 10a. The output direction of the illumination light L1 is optimally adjusted according to the first optical scanning unit 10a. Therefore, the incident angle $\theta a$ of the illumination light L1 incident on the first optical scanning unit 10a can be optimized.

When the second optical scanning unit 10b is selected, the light source 1b emits illumination light L2. The illumination light L2 from the light source 1b is totally reflected on the mirror 28 and then reflected on the half mirror 21. Subsequently, the illumination light L2 enters the second optical scanning unit 10b. At this time, a way of emitting the illumination light L2 from the light source 1b is adjusted to be optimal according to the second optical scanning unit 10b. Therefore, the incident angle $\theta b$ can be optimized.

Therefore, in Modified Example 5, the illumination light L1, which is incident on the first optical scanning unit 10a at the optimal incident angle $\theta a$, and the illumination light L2, which is incident on the second optical scanning unit 10b at the optimal incident angle $\theta b$, are combined together at the half mirror 27. Subsequently, according to the selected optical scanning unit, by using either the illumination light L1 or the illumination light L2, the illumination light L1 or L2 can be incident at an optimal incident angle $\theta$ when either of the optical scanning units is selected. Thus, also in Modified Example 5, illumination light L is incident on the selected optical scanning unit 10 at an optimal incident angle $\theta$. Therefore, an image having high S/N ratio and high resolution can be produced.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A confocal optical scanner, comprising:
a plurality of condenser elements each configured to concentrate illumination light to be applied on a sample to produce fluorescence from the sample;
a plurality of optical scanning units including a plurality of openings each configured to allow the illumination light concentrated by the condenser element to pass through the opening, the optical scanning units each configured to scan the sample with the illumination light that has passed through the opening;
a moving mechanism configured to move the optical scanning units to select one of the optical scanning units;
an incident-angle adjusting part configured to adjust an incident angle of the illumination light incident on the optical scanning unit selected from the optical scanning units according to the selected optical scanning unit;
a reflective mirror provided for each of the optical scanning units, where the reflective mirror is secured on the moving mechanism and configured to reflect the illumination light to the optical scanning unit; and
a mirror adjusting part provided for each of the optical scanning units as the incident-angle adjusting part, where the mirror adjusting part is secured on the moving mechanism and configured to adjust an angle of the reflective mirror.

2. The confocal optical scanner according to claim 1, wherein
the optical scanning unit includes:
a condenser disk having the condenser elements spirally arranged in a multiple-thread pattern;

a pinhole disk having pinholes as the openings, where the pinholes are arranged in the same pattern as the condenser elements; and
a connection rotary motor configured to integrally rotate the condenser disk and the pinhole disk.

3. A confocal microscope, comprising:
the confocal optical scanner according to claim 1;
a light source configured to emit the illumination light; and
a detection unit configured to detect the fluorescence as return light.

4. A confocal optical scanner, comprising:
a plurality of condenser elements each configured to concentrate illumination light to be applied on a sample to produce fluorescence from the sample;
a plurality of optical scanning units including a plurality of openings each configured to allow the illumination light concentrated by the condenser element to pass through the opening, the optical scanning units each configured to scan the sample with the illumination light that has passed through the opening;
a moving mechanism configured to move the optical scanning units to select one of the optical scanning units;
an incident-angle adjusting part configured to adjust an incident angle of the illumination light incident on the optical scanning unit selected from the optical scanning units according to the selected optical scanning unit;
a reflective mirror provided for each of the optical scanning units and configured to reflect the illumination light to the optical scanning unit;
a mirror adjusting part provided for each of the optical scanning units as the incident-angle adjustment part and configured to adjust an angle of the reflective mirror; and
a mirror switching part configured to switch one reflective mirror to another reflective mirror according to the selected optical scanning unit.

5. The confocal optical scanner according to claim 4, wherein
the optical scanning unit includes:
a condenser disk having the condenser elements spirally arranged in a multiple-thread pattern;
a pinhole disk having pinholes as the openings, where the pinholes are arranged in the same pattern as the condenser elements; and
a connection rotary motor configured to integrally rotate the condenser disk and the pinhole disk.

6. A confocal microscope, comprising:
the confocal optical scanner according to claim 4;
a light source configured to emit the illumination light; and
a detection unit configured to detect the fluorescence as return light.

7. A confocal optical scanner, comprising:
a plurality of condenser elements each configured to concentrate illumination light to be applied on a sample to produce fluorescence from the sample;
a plurality of optical scanning units including a plurality of openings each configured to allow the illumination light concentrated by the condenser element to pass through the opening, the optical scanning units each configured to scan the sample with the illumination light that has passed through the opening;
a moving mechanism configured to move the optical scanning units to select one of the optical scanning units;
an incident-angle adjusting part configured to adjust an incident angle of the illumination light incident on the optical scanning unit selected from the optical scanning units according to the selected optical scanning unit;
one reflective mirror configured to reflect the illumination light to the optical scanning unit; and
a mirror driving part configured to change and adjust an angle of the reflective mirror according to the selected optical scanning unit.

8. The confocal optical scanner according to claim 7, wherein
the optical scanning unit includes:
a condenser disk having the condenser elements spirally arranged in a multiple-thread pattern;
a pinhole disk having pinholes as the openings, where the pinholes are arranged in the same pattern as the condenser elements; and
a connection rotary motor configured to integrally rotate the condenser disk and the pinhole disk.

9. A confocal microscope, comprising:
the confocal optical scanner according to claim 7;
a light source configured to emit the illumination light; and
a detection unit configured to detect the fluorescence as return light.

10. A confocal optical scanner, comprising:
a plurality of condenser elements each configured to concentrate illumination light to be applied on a sample to produce fluorescence from the sample;
a plurality of optical scanning units including a plurality of openings each configured to allow the illumination light concentrated by the condenser element to pass through the opening, the optical scanning units each configured to scan the sample with the illumination light that has passed through the opening;
a moving mechanism configured to move the optical scanning units to select one of the optical scanning units; and
an incident-angle adjusting part configured to adjust an incident angle of the illumination light incident on the optical scanning unit selected from the optical scanning units according to the selected optical scanning unit, wherein
the incident-angle adjusting part includes an acousto-optic element, where the acousto-optic element is configured to change a traveling direction of the illumination light by diffracting the illumination light according to the selected optical scanning unit.

11. The confocal optical scanner according to claim 10, wherein
the optical scanning unit includes:
a condenser disk having the condenser elements spirally arranged in a multiple-thread pattern;
a pinhole disk having pinholes as the openings, where the pinholes are arranged in the same pattern as the condenser elements; and
a connection rotary motor configured to integrally rotate the condenser disk and the pinhole disk.

12. A confocal microscope, comprising:
the confocal optical scanner according to claim 10;
a light source configured to emit the illumination light; and
a detection unit configured to detect the fluorescence as return light.

13. A confocal optical scanner, comprising:
a plurality of condenser elements each configured to concentrate illumination light to be applied on a sample to produce fluorescence from the sample;
a plurality of optical scanning units including a plurality of openings each configured to allow the illumination light concentrated by the condenser element to pass through the opening, the optical scanning units each configured to scan the sample with the illumination light that has passed through the opening;

a moving mechanism configured to move the optical scanning units to select one of the optical scanning units;
an incident-angle adjusting part configured to adjust an incident angle of the illumination light incident on the optical scanning unit selected from the optical scanning units according to the selected optical scanning unit; and
a half mirror configured to combine a plurality of rays of the illumination light each having the incident angle adjusted for each of the optical scanning units, where among the plurality of rays of the illumination light, a ray of illumination light according to the selected optical scanning unit is incident on the optical scanning unit.

14. The confocal optical scanner according to claim 13, wherein
the optical scanning unit includes:
a condenser disk having the condenser elements spirally arranged in a multiple-thread pattern;
a pinhole disk having pinholes as the openings, where the pinholes are arranged in the same pattern as the condenser elements; and
a connection rotary motor configured to integrally rotate the condenser disk and the pinhole disk.

15. A confocal microscope, comprising:
the confocal optical scanner according to claim 13;
a light source configured to emit the illumination light; and
a detection unit configured to detect the fluorescence as return light.

16. A confocal optical scanner, comprising:
a plurality of condenser elements each configured to concentrate illumination light to be applied on a sample to produce fluorescence from the sample;
a plurality of optical scanning units including a plurality of openings each configured to allow the illumination light concentrated by the condenser element to pass through the opening, the optical scanning units each configured to scan the sample with the illumination light that has passed through the opening;
a moving mechanism configured to move the optical scanning units to select one of the optical scanning units; and
an incident-angle adjusting part configured to adjust an incident angle of the illumination light incident on the optical scanning unit selected from the optical scanning units according to the selected optical scanning unit, wherein
the openings are slit-shaped confocal openings.

17. The confocal optical scanner according to claim 16, wherein
the optical scanning unit includes:
a condenser disk having the condenser elements spirally arranged in a multiple-thread pattern;
a pinhole disk having pinholes as the openings, where the pinholes are arranged in the same pattern as the condenser elements; and
a connection rotary motor configured to integrally rotate the condenser disk and the pinhole disk.

18. A confocal microscope, comprising:
the confocal optical scanner according to claim 16;
a light source configured to emit the illumination light; and
a detection unit configured to detect the fluorescence as return light.

19. A confocal optical scanner, comprising:
a plurality of condenser elements each configured to concentrate illumination light to be applied on a sample to produce fluorescence from the sample;
a plurality of optical scanning units including a plurality of openings each configured to allow the illumination light concentrated by the condenser element to pass through the opening, the optical scanning units each configured to scan the sample with the illumination light that has passed through the opening;
a moving mechanism configured to move the optical scanning units to select one of the optical scanning units; and
an incident-angle adjusting part configured to adjust an incident angle of the illumination light incident on the optical scanning unit selected from the optical scanning units according to the selected optical scanning unit, wherein
the incident-angle adjusting part includes:
a reflective mirror configured to reflect the illumination light to the optical scanning unit; and
a piezo actuator configured to adjust an angle of the reflective mirror.

20. The confocal optical scanner according to claim 19, wherein
the optical scanning unit includes:
a condenser disk having the condenser elements spirally arranged in a multiple-thread pattern;
a pinhole disk having pinholes as the openings, where the pinholes are arranged in the same pattern as the condenser elements; and
a connection rotary motor configured to integrally rotate the condenser disk and the pinhole disk.

21. A confocal microscope, comprising:
the confocal optical scanner according to claim 19;
a light source configured to emit the illumination light; and
a detection unit configured to detect the fluorescence as return light.

* * * * *